Dec. 8, 1931.  B. PHILLIPS  1,835,896
AIR SERVICE COLUMN
Filed March 2, 1928
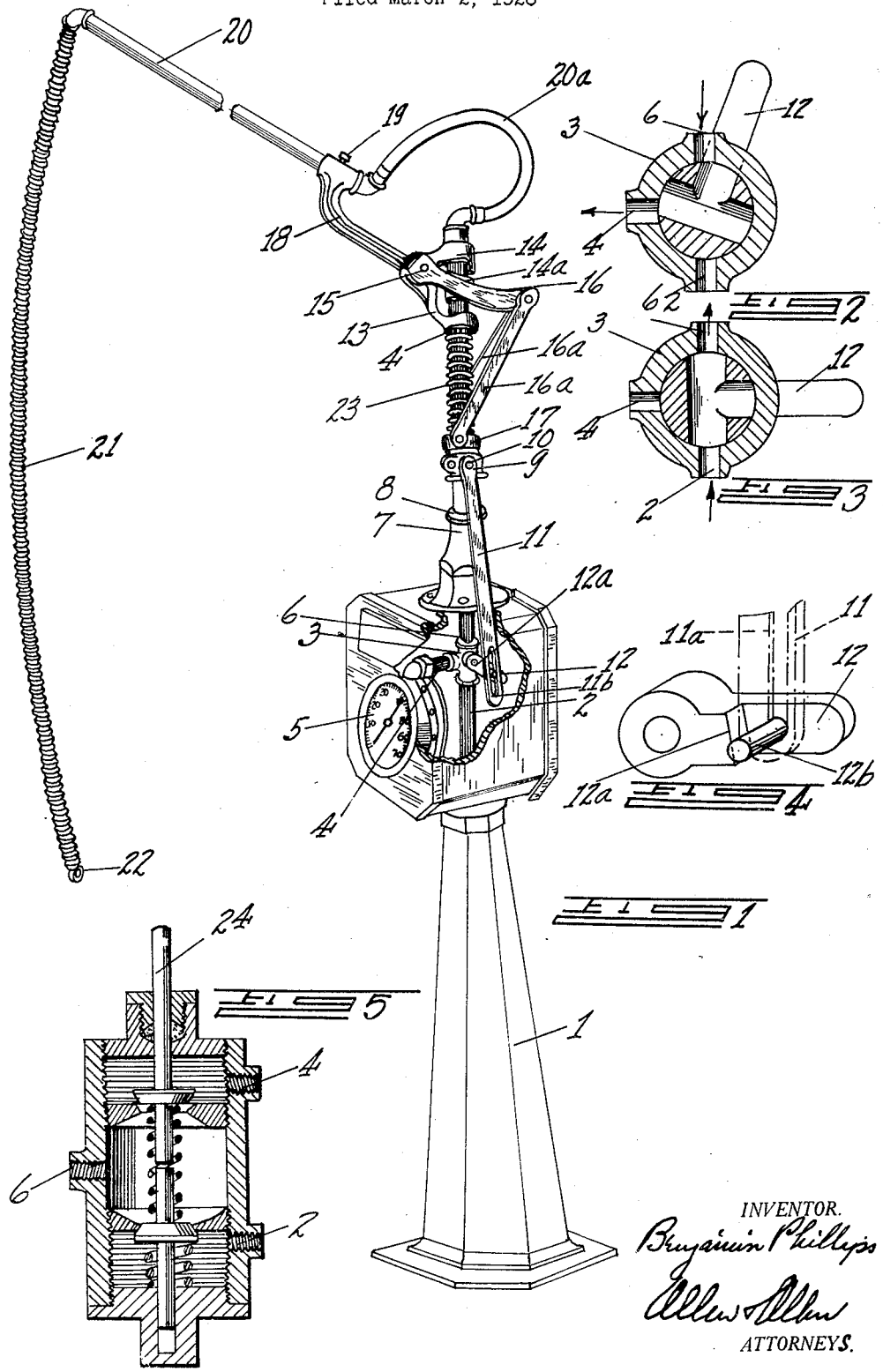

Patented Dec. 8, 1931

1,835,896

UNITED STATES PATENT OFFICE

BENJAMIN PHILLIPS, OF CINCINNATI, OHIO

AIR SERVICE COLUMN

Application filed March 2, 1928. Serial No. 258,571.

My invention relates to air service columns to which are attached flexible pipes with which the tires of automobiles may be inflated.

In the art there are several well known types of air service columns which have a hose connection which may be pulled down so that the valve coupling on the end of the hose will reach to the different tires. When the hose is released it swings up under spring tension, clear of the automobile. My object is to provide, in this type of column, for a new type of attachment to be carried on the top of the column which will permit the hose to be swiveled around and which will also permit the hose to be pulled down for use in tire inflation. In combination with the connection on the top of the column it is my object to provide a three-way valve or a combination of valves which will be actuated by the movement of the parts, and which will, in accordance with the position in which the hose is held, open the air pipe to the hose connection, or register the air pressure within the tire on a gauge.

The above and other objects to which reference will be made in the accompanying disclosure I accomplish by that certain combination and arrangement of parts of which I have shown a preferred modification.

In the drawings:—

Figure 1 is a perspective view of the complete column.

Figure 2 is a diagrammatic sectional view of a three-way cock in the position which it will assume when the hose is pulled clear down.

Figure 3 is a diagrammatic sectional view of the cock when the hose is slightly released from its extreme downward position.

Figure 4 is a perspective view of the cock and link connection which delays the operation of the cock until the hose reaches a low limit of movement.

Figure 5 is a sectional view of a different type of valve which I have found is not as likely to leak as a three-way cock.

The column has a supporting base 1 through which the air line extends. The air tank and pump for pumping up pressure are usually within an adjacent building and the particular manner in which the air line is connected to the column is of no particular importance, and forms no part of my invention. At a suitable distance above the base I have provided a casing the interior of which is shown in Figure 1. The air pipe 2 is connected to a three-way cock generally indicated at 3. One outlet of the cock has a pipe 4 connected to it which carries a pressure gauge 5 of conventional type having a face which is shown as exposed on the exterior of the casing. Another branch from the cock is connected to the inlet air pipe 2. The other branch from the top is connected to a delivery pipe 6 which communicates with the tubing through which the air is delivered to the tire to be inflated.

The upper surface of the casing has a fixed sleeve 7 which extends upwardly from the surface of the casing and has a flanged portion 8 which acts as an abutment to limit the downward movement of a slidable but non-rotatable collar 9. The collar 9 has a boss 10 on it to which is connected the upper end of a link 11 which connects to an arm 12 which actuates the three-way cock as indicated. A support 13 has sleeve-like portions 14 which engage the delivery pipe 6. The sleeve-like portions are held in rotatable but non-slidable position by one or more collars such as the collar indicated at 14a. The supporting piece 13 has pivotally mounted thereon, as indicated at 15, a forked bracket 16 which has one or more arms 16a which are pivotally connected to a rotatable collar 17. The collar 17 bears against the collar 9 and through the link 11 moves the cock to its different positions.

I prefer to have the cock moved to its several positions with the inflating tube near its low limit of movement. In order to accomplish this the arm 12 is provided with a boss 12a. A pin 12b extends from the arm 12 which is engaged by the slotted portion 11a of the link 11. When the inflating hose is pulled down the pin slides in the slot until it is engaged at its lower end. When the tube is released, however, the lower left edge 11b of the link 11 strikes the boss 12a and thereby turns the cock. As soon as the cock turns with the arm 12 the edge 11b slides past the boss and the pin 12b slides toward the upper end of the slotted portion of the link.

An arm 18 extends up from the bracket 16 and a tubular portion of the arm has a set screw 19 extending therethrough which clamps a pipe 20. A flexible hose 20a connects the pipe 6 with the pipe 20. Flexible tubing 21 is secured to the end of the pipe 20 and a valved coupling piece 22 is attached at the delivery end of the hose for connection to the valve of a tire.

A spring 23 which is mounted on the delivery pipe 6 or a casing surrounding it presses against the collar 17 and thus tends to elevate the arm 18, thus raising the tube 21 clear of the automobile. The tube 21 is normally held in elevated position, and when a person wishes to test or inflate the tires of his car he pulls up alongside of the column, and taking the delivery end of the tube 21 in one hand, he pulls it down.

The operation of the valve control is as follows: In Figures 2 and 3 I have illustrated the different positions of the valve, which, in this instance, is a three-way cock. The first position, as indicated in Figure 2, will admit air from the tire back into the cock body and from thence to the gauge. This position is brought about by pulling down on the hose to the full limit of its downward movement. If the tire needs more air the person using the apparatus allows the spring to pull upward a short distance on the hose. The cock then is moved to the position indicated in Figure 3 which is the normal position of the cock admitting air from the supply pipe through the cock into the tube and from thence into the tire. If enough air has been added this will be indicated when the tube is again pulled downwardly so that the cock assumes the position indicated in Figure 2.

Figure 5 shows in section another type of three-way valve. This valve will, if the valve is in the position indicated, indicate on the gauge the pressure within the tire. If, however, the valve rod 24 is pushed down both the upper valve will close and the lower valve will be raised from its seat and air will pass from the supply port 2 through the valve body into the delivery port 6. The use of this valve will be similar to that with the three-way cock and the only change necessary will be to connect the lower end of the link 11 directly to the upper end of the valve rod 24.

Modifications in the valve arrangements suggested will readily occur to those skilled in the art, and it will, of course, be possible to have two independent valves instead of having the valve combined in a single unit.

Having thus described my invention, what I claim as new and desire to secure by Letters Patent, is:—

1. An air service column having a gauge carried thereon, a delivery hose extending therefrom, an air supply pipe extending through said column, valve means within said column and normally open for opening passages from the supply to the delivery hose, said column having mechanical means permitting the delivery hose to be lowered for tire inflation, and means operatively connected with said hose for controlling the operation of said valve means, said valve means having a pipe extending to said gauge, and said valve means and last named means being so arranged that an extreme lowered position of the hose will open a passage from the delivery hose to said gauge and at the same time closing the passage from said supply pipe.

2. In an air service device, a compressed air supply conductor, a pressure gauge, a movable conductor to supply air to a tire, a valve operable either to make a connection from said air supply conductor to said movable conductor or to make a connection from said movable conductor to said gauge, and means connecting said movable conductor to said valve, whereby said valve is operated to make one or the other of said connections according to one or another position of said movable conductor.

3. An air service column provided with means for supplying compressed air thereto, said column also having a delivery hose for supplying air for tire inflation purposes, said delivery hose being mounted so as to be movable from an elevated position to a position in which it may be conveniently used, a gauge for indicating gaseous pressure, valve means having a sequence of operations in which it opens a passage from the supply to the delivery hose, or opens a passage from the gauge to the delivery hose and closes off the supply pipe during such time as the passage is opened from the delivery hose to the gauge, and means connecting the delivery hose with the valve means for controlling, at extremely lowered position, said sequence of operations of said valve means.

4. An air service column provided with means for supplying compressed air thereto, said column also having a delivery hose for supplying air for tire inflation purposes, said delivery hose being mounted so as to be movable from an elevated position to a position in which it may be conveniently used, a gauge for indicating gaseous pressure, valve means having a sequence of operations in which it opens a passage from the supply to the delivery hose, or opens a passage from the gauge to the delivery hose, and closes off the supply pipe during such time as the passage is opened from the delivery hose to the gauge, and means connecting the delivery hose with the valve means for controlling said sequence of operations of said valve means, said connection being such that the sequence of operations of said valve means is induced close to the lowered position of convenient use for said delivery hose.

5. An air service column provided with a compressed air supply pipe and an air delivery hose, said delivery hose having a swiveled supporting structure which will permit said hose to be lowered for use, a gauge connected to said column for registering the air pressure in the delivery hose, and valve means operatively connected with said supporting structure, normally open for permitting the flow of air to said delivery hose, and for also cutting off the flow of air from the supply pipe to said delivery hose, during which the gauge will register back pressure in said delivery hose, said valve means being controlled according to the position of said air delivery hose.

6. An air service column provided with a compressed air supply pipe and an air delivery hose, said delivery hose having a swiveled supporting structure which will permit said hose to be lowered for use, a gauge connected to said column for registering the air pressure in the delivery hose, and valve means operatively connected with said supporting structure, normally open for permitting the flow of air to said delivery hose, and means for controlling the flow of air from said delivery hose to said gauge, said valve means being controlled incident to extremely depressed position of said air delivery hose.

BENJAMIN PHILLIPS.